United States Patent
Sakabe et al.

(10) Patent No.: US 9,731,771 B2
(45) Date of Patent: Aug. 15, 2017

(54) VEHICLE UPPER PORTION STRUCTURE

(71) Applicant: TOYOTA JIDOSHA KABUSHIKI KAISHA, Toyota-shi, Aichi-ken (JP)

(72) Inventors: Motoya Sakabe, Nissin (JP); Kazuki Sugie, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/979,028

(22) Filed: Dec. 22, 2015

(65) Prior Publication Data

US 2016/0297482 A1    Oct. 13, 2016

(30) Foreign Application Priority Data

Apr. 9, 2015    (JP) ................ 2015-080003

(51) Int. Cl.
| B62D 25/06 | (2006.01) |
| G01S 17/93 | (2006.01) |
| G01S 7/481 | (2006.01) |
| G01S 13/93 | (2006.01) |
| G01S 7/02 | (2006.01) |

(52) U.S. Cl.
CPC ............ B62D 25/06 (2013.01); G01S 7/4813 (2013.01); G01S 17/936 (2013.01); *G01S 13/931* (2013.01); *G01S 2007/027* (2013.01); *G01S 2013/9364* (2013.01); *G01S 2013/9367* (2013.01); *G01S 2013/9382* (2013.01)

(58) Field of Classification Search
CPC .................................................. G01S 17/936
USPC ........................................... 296/215; 224/329
See application file for complete search history.

(56) References Cited

U.S. PATENT DOCUMENTS

| 6,118,410 A * | 9/2000 | Nagy ................... H01Q 1/1271 343/700 MS |
| 6,198,386 B1 * | 3/2001 | White, II .................. B60R 1/00 33/264 |
| 7,227,508 B2 * | 6/2007 | Wang ..................... H01Q 1/288 343/713 |
| 8,282,158 B2 * | 10/2012 | Verhee ................... B62D 25/06 296/215 |
| 9,270,017 B2 * | 2/2016 | Villarroel ............. H01Q 1/1271 |
| 9,436,182 B2 * | 9/2016 | Nemec ................. G05D 1/0055 |
| 9,600,768 B1 * | 3/2017 | Ferguson ................. G06N 5/02 |
| 2004/0212223 A1 * | 10/2004 | Donovan ................ B60R 11/02 296/216.01 |

(Continued)

FOREIGN PATENT DOCUMENTS

| DE | 102009060392 | * | 6/2011 |
| EP | 0214745 | * | 3/1987 |
| EP | 1921708 | * | 5/2008 |

(Continued)

*Primary Examiner* — Dennis H Pedder
(74) *Attorney, Agent, or Firm* — Oliff PLC (57) ABSTRACT

A vehicle, to which a vehicle upper portion structure is applied, has: a peripheral information detecting sensor that is mounted to a vehicle upper portion, and that has a detecting section that obtains peripheral information of the vehicle by detecting a detection medium; and a roof panel that covers the peripheral information detecting sensor from a vehicle upper side, and at which at least a region, that faces the detecting section, is formed of a material that transmits the detection medium therethrough.

7 Claims, 7 Drawing Sheets

(56) References Cited

U.S. PATENT DOCUMENTS

2008/0106124 A1\* 5/2008 Snider ................... B60J 7/0015
                                                         296/215

FOREIGN PATENT DOCUMENTS

| FR | 2919120      | \* | 1/2009  |
|----|--------------|----|---------|
| GB | 525720       | \* | 9/1940  |
| JP | 2005-291808 A |   | 10/2005 |
| JP | 2007-187632 A |   | 7/2007  |
| JP | 2009-113784 A |   | 5/2009  |
| JP | 2015-107764 A |   | 6/2015  |
| WO | WO142051     | \* | 6/2001  |

\* cited by examiner

VEHICLE UPPER PORTION STRUCTURE

CROSS-REFERENCE TO RELATED APPLICATION

This application claims priority under 35 USC 119 from Japanese Patent Application No. 2015-080003 filed Apr. 9, 2015, the disclosure of which is incorporated by reference herein.

BACKGROUND OF THE INVENTION

Technical Field

The present invention relates to a vehicle upper portion structure.

Related Art

Japanese Patent Application Laid-Open (JP-A) No. 2005-291808 discloses a structure in which an onboard radar device (peripheral information detecting sensor) is disposed on the roof panel of a vehicle, and peripheral information of the vehicle is detected by this onboard radar device.

SUMMARY

However, in a structure in which a peripheral information detecting sensor is disposed on a roof panel, the peripheral information detecting sensor is conspicuous, and there is room for improvement from the standpoint of improving the appearance of the vehicle.

In view of the above-described circumstances, an object of the present invention is to provide a vehicle upper portion structure that can improve the appearance of a vehicle in a structure in which a peripheral information detecting sensor is provided at a vehicle upper portion.

A vehicle upper portion structure of a first aspect includes a peripheral information detecting sensor that is mounted to a vehicle upper portion, and that has a detecting section that obtains peripheral information of a vehicle by detecting a detection medium, and a roof panel that covers the peripheral information detecting sensor from a vehicle upper side, and at which at least a region, that faces the detecting section, is formed of a material that transmits the detection medium therethrough.

In the vehicle upper portion structure of the first aspect, the peripheral information detecting sensor is mounted to the vehicle upper portion. The peripheral information detecting sensor has the detecting section that detects a detection medium. The peripheral information detecting sensor is structured so as to be able to obtain peripheral information of the vehicle due to the detecting section detecting the detection medium. Further, the peripheral information detecting sensor is covered from the vehicle upper side by the roof panel, and at least the region of the roof panel, which region faces the detecting section, is formed of a material that transmits the detection medium therethrough. By covering the peripheral information detecting sensor by the roof panel from the vehicle upper side in this way, the peripheral information detecting sensor is inconspicuous as compared with a structure in which the peripheral information detecting sensor is disposed on the roof panel.

Further, because the detection medium is transmitted through the roof panel, peripheral information of the vehicle can be detected even if the peripheral information detecting sensor is covered by the roof panel. Note that what is called "detection medium" here is a concept that includes various media that can be detected by a sensor, and includes radio waves, light, and ultrasonic waves.

In a vehicle upper portion structure of a second aspect, in the first aspect, the peripheral information detecting sensor is mounted to a reinforcing member that spans in a vehicle transverse direction between a pair of left and right roof side rails that extend in a vehicle longitudinal direction.

In the vehicle upper portion structure of the second aspect, the mounting strength of the peripheral information detecting sensor can be increased due to the peripheral information detecting sensor being mounted to the reinforcing member that spans between the roof side rails. Due thereto, vibration that is applied to the peripheral information detecting sensor during traveling can be reduced.

In a vehicle upper portion structure of a third aspect, in the second aspect, the reinforcing member is disposed so as to be offset toward a vehicle lower side with respect to the roof panel, and the peripheral information detecting sensor is mounted between the reinforcing member and the roof panel.

In the vehicle upper portion structure of the third aspect, due to the reinforcing member being disposed so as to be offset toward the vehicle lower side, space for mounting the peripheral information detecting sensor can be ensured without changing the shape of the roof panel. Due thereto, the roof panel can be structured by a continuous curved surface without being made to bulge-out locally. As a result, as compared with a structure in which the peripheral information detecting sensor projects-out on the roof, air resistance at the time of traveling can be reduced, and the aerodynamic performance can be improved. Further, wind noise at the time of traveling can be reduced.

In a vehicle upper portion structure of a fourth aspect, in the second aspect or the third aspect, the roof panel is supported by the peripheral information detecting sensor that is mounted to the reinforcing member.

In the vehicle upper portion structure of the fourth aspect, load that is applied to the roof panel can be received at the reinforcing member via the peripheral information detecting sensor. Due thereto, the rigidity of the roof panel can be improved as compared with a structure in which a gap is provided between the roof panel and the peripheral information detecting sensor.

In a vehicle upper portion structure of a fifth aspect, in the first aspect or the second aspect, a sunroof unit, that has a sunroof that structures a portion of the roof panel, is provided at the vehicle upper portion, and the peripheral information detecting sensor is mounted to a frame member, that structures the sunroof unit, and is covered by the sunroof from the vehicle upper side.

In the vehicle upper portion structure of the fifth aspect, due to the peripheral information detecting sensor being mounted to the frame member that structures the sunroof unit, there is no need to separately provide a member for mounting the peripheral information detecting sensor. Further, because the peripheral information detecting sensor is covered by the sunroof from the vehicle upper side, the external appearance is similar to that of a general vehicle that is equipped with a sunroof, and the appearance can be improved.

As described above, the vehicle upper portion structure relating to the first aspect has the excellent effect that the appearance of a vehicle can be improved in a structure in which a peripheral information detecting sensor is provided at the vehicle upper portion.

The vehicle upper portion structure relating to the second aspect has the excellent effect that the detection accuracy of the peripheral information detecting sensor at the time when the vehicle travels can be maintained good.

The vehicle upper portion structure relating to the third aspect has the excellent effects that the aerodynamic performance is improved and noise at the time of traveling can be reduced.

The vehicle upper portion structure relating to the fourth aspect has the excellent effect that the dent-resistance can be ensured.

The vehicle upper portion structure relating to the fifth aspect has the excellent effect that the number of parts needed for mounting the peripheral information detecting sensor to a vehicle having a sunroof can be reduced.

BRIEF DESCRIPTION OF THE DRAWINGS

Embodiments of the present invention will be described in detail based on the following figures, wherein.

DETAILED DESCRIPTION OF THE INVENTION

First Embodiment

A vehicle upper portion structure relating to a first embodiment of the present invention is described hereinafter with reference to FIG. 1 and FIG. 2. Note that arrow FR that is shown appropriately in the respective drawings indicates the vehicle front side, arrow UP indicates the vehicle upper side, and arrow OUT indicates the vehicle transverse direction outer side. Further, in the following description, when longitudinal, vertical and left-right directions are used without being specified, they mean the longitudinal of the vehicle longitudinal direction, the vertical of the vehicle vertical direction, and the left and right when facing in the advancing direction.

Figure 1:
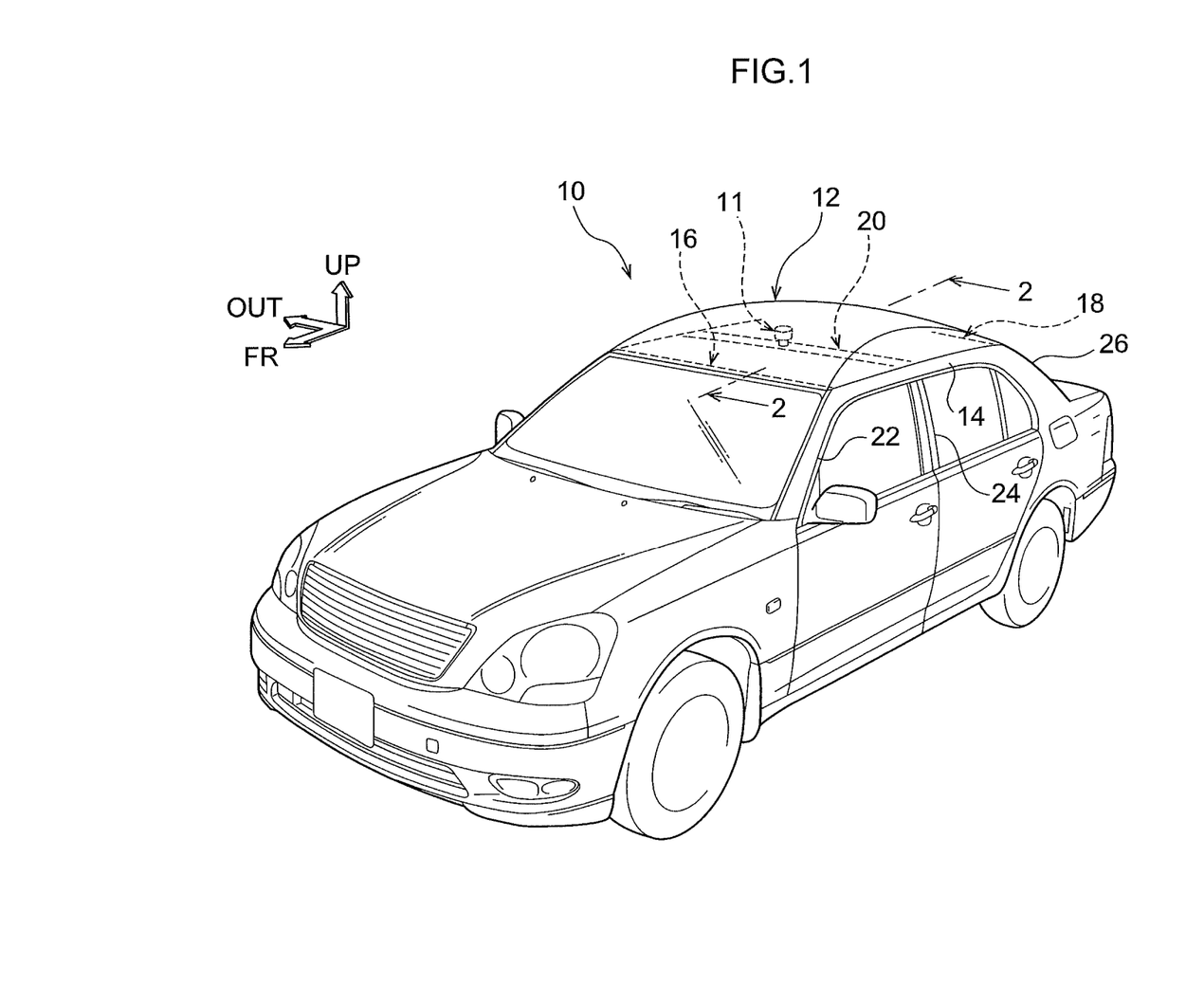
FIG. 1 is a perspective view showing a vehicle to which a vehicle upper portion structure relating to a first embodiment is applied.

As shown in FIG. 1, a roof panel 12 is disposed at the vehicle upper portion of vehicle 10 to which the vehicle upper portion structure relating to the present embodiment is applied. Further, a pair of left and right roof side rails 14 are disposed at the vehicle transverse direction both sides of the roof panel 12.

The roof side rails 14 respectively extend in the vehicle longitudinal direction. Front pillars 22 extend toward the vehicle lower side from the front end portions of the roof side rails 14. Further toward the vehicle rear side than the front pillars 22, center pillars 24 extend toward the vehicle lower side from the roof side rails 14. Further toward the vehicle rear side than the center pillars 24, rear pillars 26 extend toward the vehicle lower side from the roof side rails 14. Note that the front pillars 22, the center pillars 24 and the rear pillars 26 are respectively provided as left-right pairs.

Moreover, a front header 16 and a rear header 18 span along the vehicle transverse direction between the pair of roof side rails 14. The front header 16 spans between the front end portions of the roof side rails 14, and the rear header 18 spans between the rear end portions of the roof side rails 14. Further, a roof reinforcement 20 that serves as a reinforcing member spans along the vehicle transverse direction between the front header 16 and the rear header 18. Here, the roof reinforcement 20 is disposed so as to be offset toward the vehicle lower side with respect to the roof panel 12. Further, a peripheral information detecting sensor 11 is disposed between the roof reinforcement 20 and the roof panel 12.

Figure 2:
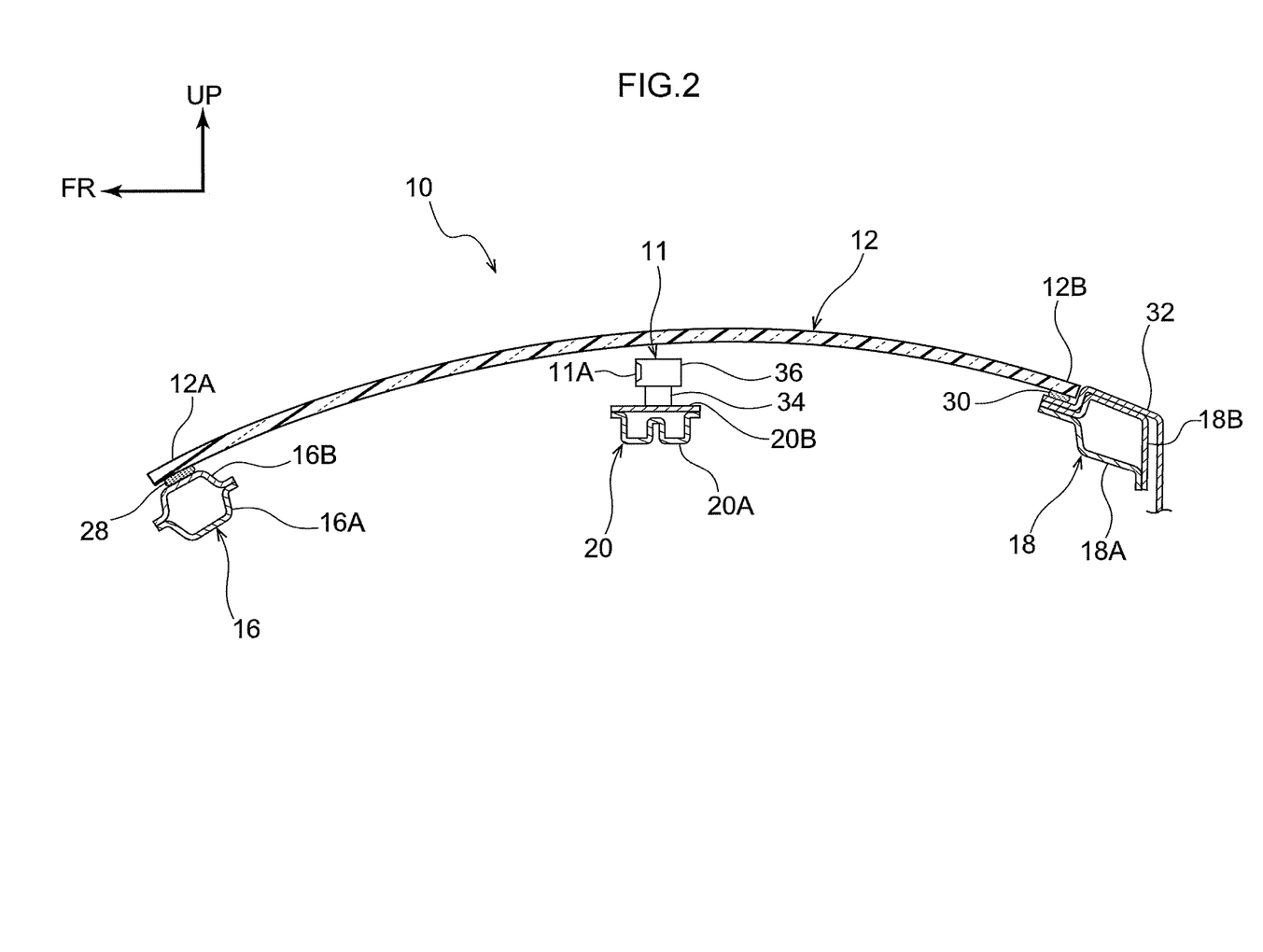
FIG. 2 is a cross-sectional view showing, in an enlarged manner, the state cut at line 2-2 of FIG. 1.

As shown in FIG. 2, the roof panel 12 is curved so as to be convex toward the vehicle upper side, as seen from the vehicle transverse direction. Further, a front end portion 12A of the roof panel 12 is joined to the upper portion of the front header 16 by an adhesive material 28. A rear end portion 12B of the roof panel 12 is joined to the upper portion of the rear header 18 by an adhesive material 30.

The front header 16 includes a front header inner panel 16A, that is disposed at the vehicle inner side and is formed in a substantial hat-shape in cross-section, and a front header outer panel 16B, that is disposed at the vehicle outer side and is formed in a substantial hat-shaped in cross-section, and the front header 16 is made to be a closed cross-sectional structure. The roof panel 12 is joined to the top surface of the front header outer panel 16B.

On the other hand, the rear header 18 includes a rear header inner panel 18A that is disposed at the vehicle inner side, and a rear header outer panel 18B that is disposed at the vehicle outer side, and the rear header 18 is made to be a closed cross-sectional structure. A rear outer panel 32 is joined to the top surface of the rear header outer panel 18B. Here, a flange portion extends-out from the front end portion of the rear outer panel 32 toward the vehicle front side, and the roof panel 12 is joined to the top surface of this flange portion.

The roof reinforcement 20, that is disposed between the front header 16 and the rear header 18, includes an inner panel 20A, that is disposed at the vehicle inner side and is substantially W-shaped in cross-section, and an outer panel 20B, that is disposed at the vehicle outer side and is substantially flat-plate-shaped, and the roof reinforcement 20 is made to be a closed cross-sectional structure. Further, the peripheral information detecting sensor 11 is mounted, by unillustrated fasteners such as bolts and nuts or the like, to the top surface of the outer panel 20B.

Here, in the present embodiment, a laser radar, that detects peripheral information by scanning laser light and measuring the time until the reflected light returns, is used as an example of the peripheral information detecting sensor 11. Further, the peripheral information detecting sensor 11 is structured to include a base portion 34 that is substantially shaped as a cylinder, and a rotating portion 36 that is substantially shaped as a cylinder of a larger diameter than the base portion 34 and that is disposed at the upper portion of the base portion 34. A detecting section 11A is provided at the rotating portion 36.

The detecting section 11A is structured so as to be able to obtain peripheral information of the vehicle 10 by detecting a detection medium. In the present embodiment, the region that illuminates laser light, that is the detection medium, and receives light is the detecting section 11A. Therefore, the peripheral information detecting sensor 11 is structured so as to, while rotating the rotating portion 36, illuminate laser light from the detecting section 11A and receive the reflected light thereof.

The peripheral information detecting sensor 11 that is structured as described above is covered from the vehicle upper side by the roof panel 12. Here, at least the region of the roof panel 12, which region faces the detecting section, is formed of a material that transmits the detection medium therethrough. In the present embodiment, the roof panel 12 is formed from a transparent resin so as to transmit therethrough the laser light that is illuminated from the detecting section 11A.

Further, an unillustrated controller, that controls the traveling of the vehicle 10 on the basis of the peripheral information detected by the peripheral information detecting sensor 11 and the like, is provided at the vehicle 10 of the present embodiment. This controller and the peripheral information detecting sensor 11 are electrically connected. Further, the controller is electrically connected to the EPS (Electric Power Steering), the brake ECU (Electronic Control Unit), and the like, and is structured so as to be able to control the traveling of the vehicle 10 without a driver driving the vehicle 10. Note that the (controller) is not limited to the above-described driving mode, and may be structured so as to carry out driving support (highly-sophisticated driving support) on the basis of the peripheral information detected by the peripheral information detecting sensor 11 and the like.

(Operation and Effects)

Operation and effects of the vehicle 10, to which the vehicle upper portion structure relating to the present embodiment is applied, are described next. In the present embodiment, as shown in FIG. 1, the peripheral information detecting sensor 11 is mounted to the roof reinforcement 20 of the vehicle upper portion. Further, traveling of the vehicle 10 is controlled on the basis of the peripheral information that the peripheral information detecting sensor 11 detects.

Here, by mounting the peripheral information detecting sensor 11 to the vehicle upper portion, laser light can be scanned from a high position. Therefore, peripheral information of the vehicle 10 can be detected effectively over a wide range. Further, the peripheral information detecting sensor 11 is covered from the vehicle upper side by the roof panel 12. Due thereto, as compared with a structure in which the peripheral information detecting sensor 11 is disposed on the roof panel 12, the peripheral information detecting sensor 11 is inconspicuous, and the appearance of the vehicle 10 can be improved. Moreover, at least the region, that faces the detecting section 11A, of the roof panel 12 is formed from a material (a transparent resin) that transmits the detection medium therethrough. Due thereto, even in a case in which the peripheral information detecting sensor 11 is covered from the vehicle upper side by the roof panel 12, peripheral information of the vehicle 10 can be detected by the peripheral information detecting sensor 11.

Further, in the present embodiment, as shown in FIG. 2, the roof reinforcement 20 is disposed so as to be offset toward the vehicle lower side with respect to the roof panel 12, and the peripheral information detecting sensor 11 is mounted between the roof reinforcement 20 and the roof panel 12. Due thereto, the space for mounting the peripheral information detecting sensor 11 can be ensured, without changing the shape of the roof panel 12. As a result, the roof panel 12 can be structured by a continuous curved surface without being made to bulge-out locally. Namely, as compared with a structure in which the peripheral information detecting sensor 11 projects-out on the roof, air resistance that is applied at the time of traveling of the vehicle 10 can be reduced, and the aerodynamic performance can be improved. Further, wind noise at the time of traveling can be reduced.

Moreover, in the present embodiment, the peripheral information detecting sensor 11 is mounted to the roof reinforcement 20 that serves as a reinforcing member and that spans between the roof side rails 14. Therefore, as compared with a case in which the peripheral information detecting sensor 11 is mounted to a member whose rigidity is low, the mounting strength of the peripheral information detecting sensor 11 can be increased. Due thereto, vibration that is applied to the peripheral information detecting sensor 11 at the time of traveling is reduced, and a deterioration in the detection accuracy of the peripheral information detecting sensor 11 can be suppressed. Namely, the detection accuracy of the peripheral information detecting sensor at the time of traveling of the vehicle can be maintained good.

Note that, in the present embodiment, a laser radar is used as the peripheral information detecting sensor 11, but the present invention is not limited to this. For example, a millimeter wave radar, an ultrasonic sensor, an optical camera, or the like may be used as the peripheral information detecting sensor 11. Here, in a case in which a millimeter wave radar is used as the peripheral information detecting sensor 11, a radio wave transmitting/receiving section is the detecting section 11A. Moreover, in a case in which an ultrasonic sensor is used as the peripheral information detecting sensor 11, a transmitter and a receiver are the detecting section 11A. Still further, in a case in which an optical camera is used as the peripheral information detecting sensor 11, a visible light light-receiving section is the detecting section. The same holds also for the second embodiment and the third embodiment that are described hereinafter.

Further, in the present embodiment, the roof panel 12 is formed of a transparent resin, but the present invention is not limited to this, and the roof panel may be formed from another material provided that it is formed from a material that transmits the detection medium therethrough. For example, in a case in which a millimeter wave radar is used as the peripheral information detecting sensor 11, it suffices to form the roof panel 12 from a material that transmits radio waves therethrough. Namely, the roof panel 12 may be formed from an opaque resin material.

Moreover, although the peripheral information detecting sensor 11 is mounted to the roof reinforcement 20 in the present embodiment, the present invention is not limited to this, and the peripheral information detecting sensor 11 may be mounted to another region. For example, as in a first modified example that the shown in FIG. 3, the peripheral information detecting sensor 11 may be mounted to a dent reinforcement 42.

Figure 3:
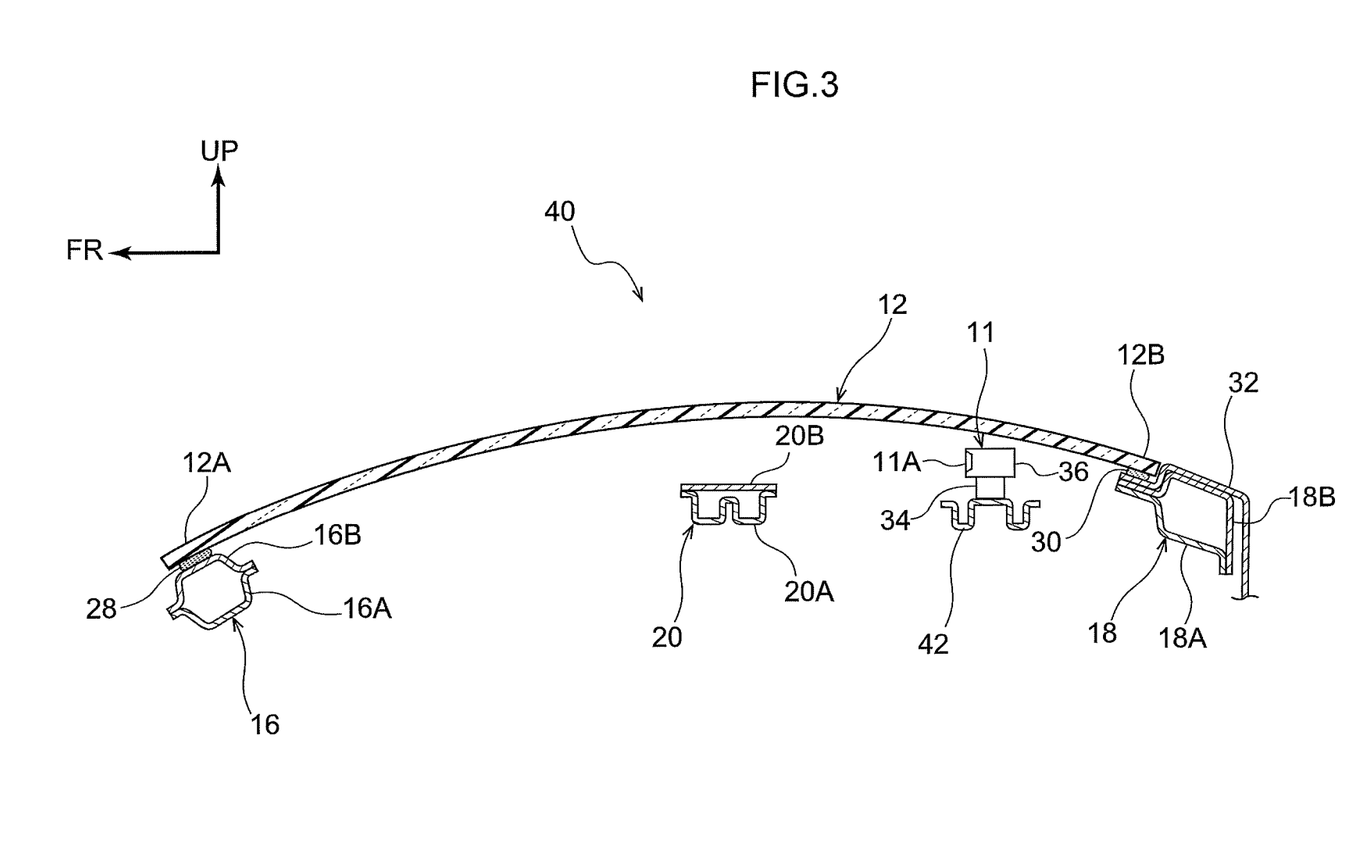
FIG. 3 is a cross-sectional view that corresponds to FIG. 2 and shows a first modified example of the vehicle upper portion structure relating to the first embodiment.

As shown in FIG. 3, in a vehicle 40 to which a vehicle upper portion structure relating to the first modified example is applied, the dent reinforcement 42 that serves as a reinforcing member is disposed between the roof reinforcement 20 and the rear header 18.

The dent reinforcement 42 is formed in a substantial W-shape in cross-section, and extends in the vehicle transverse direction, and spans between the roof side rails 14. Further, the vehicle transverse direction both end portions of the dent reinforcement 42 are positioned further toward the vehicle upper side than the vehicle transverse direction intermediate portion, and support the roof panel 12.

Here, the peripheral information detecting sensor 11 is mounted to the vehicle transverse direction intermediate portion of the dent reinforcement 42. This is a structure in which peripheral information of the vehicle 40 can be detected by the peripheral information detecting sensor 11. Further, the peripheral information detecting sensor 11 is covered by the roof panel 12 from the vehicle upper side.

The vehicle upper portion structure relating to the first modified example that is structured as described above has effects that are similar to those of the first embodiment shown in FIG. 2.

Note that, in the present modified example, the dent reinforcement 42 is disposed between the roof reinforcement 20 and the rear header 18, but is not limited to this. For example, the dent reinforcement 42 may be disposed between the roof reinforcement 20 and the front header 16, and the peripheral information detecting sensor 11 may be mounted to this dent reinforcement 42. Further, the peripheral information detecting sensor 11 may be mounted to each of the roof reinforcement 20 and the dent reinforcement 42.

Further, although a gap is provided between the roof reinforcement 20 and the roof panel 12 in the present embodiment as shown in FIG. 2, the present invention is not limited to this. For example, as in second modified example shown in FIG. 4, there may be a structure in which the peripheral information detecting sensor 11 and the roof panel 12 abut one another.

Figure 4:
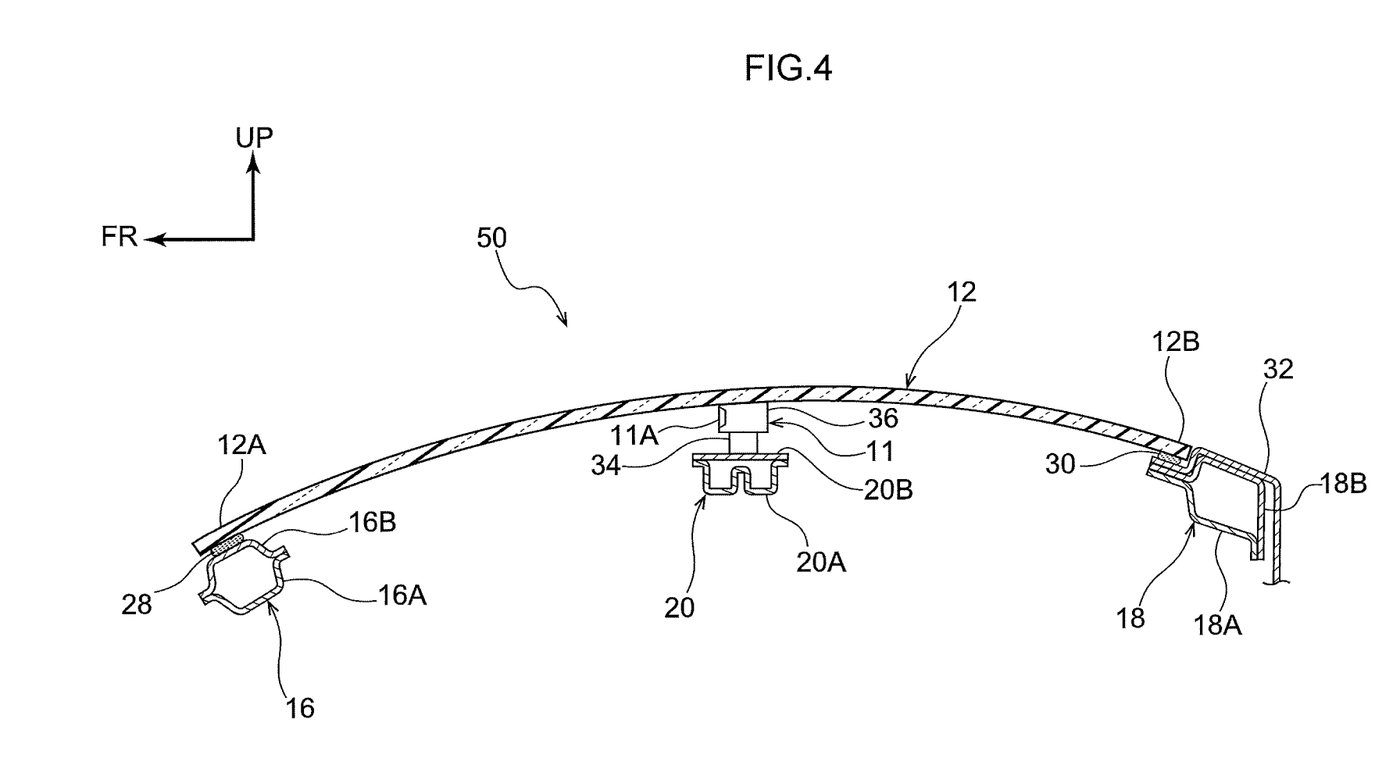
FIG. 4 is a cross-sectional view that corresponds to FIG. 2 and shows a second modified example of the vehicle upper portion structure relating to the first embodiment.

As shown in FIG. 4, in a vehicle 50 to which a vehicle upper portion structure relating to the second modified example is applied, the peripheral information detecting sensor 11 is mounted to the roof reinforcement 20, and the upper end portion of the peripheral information detecting sensor 11 abuts the roof panel 12. Namely, the roof panel 12 is supported from the vehicle lower side by the peripheral information detecting sensor 11.

In the vehicle upper portion structure relating to the second modified example that is structured as described above, the rigidity of the roof panel 12 can be improved as compared with a structure in which a gap is provided between the roof panel 12 and the peripheral information detecting sensor 11. Namely, the dent-resistance can be ensured.

Note that, in a case of applying the vehicle upper portion structure relating to the second modified example, there may be a structure in which, even in the state in which the peripheral information detecting sensor 11 is abutting the roof panel 12, for example, only a rotating body at the interior of the rotating portion 36 rotates so that the rotating portion 36 can rotate. Further, there may be a structure in which a plurality of the detecting sections 11A are disposed at the periphery of the peripheral information detecting sensor 11, and the peripheral information detecting sensor 11 does not rotate.

Second Embodiment

A vehicle, to which a vehicle upper portion structure relating to a second embodiment of the present invention is applied, is described next with reference to FIG. 5 and FIG. 6. Note that the present embodiment is made to be a structure that is similar to the first embodiment, except for a roof panel 62. Further, structures that are similar to those of the first embodiment are denoted by the same reference numerals, and description thereof is omitted.

Figure 5:
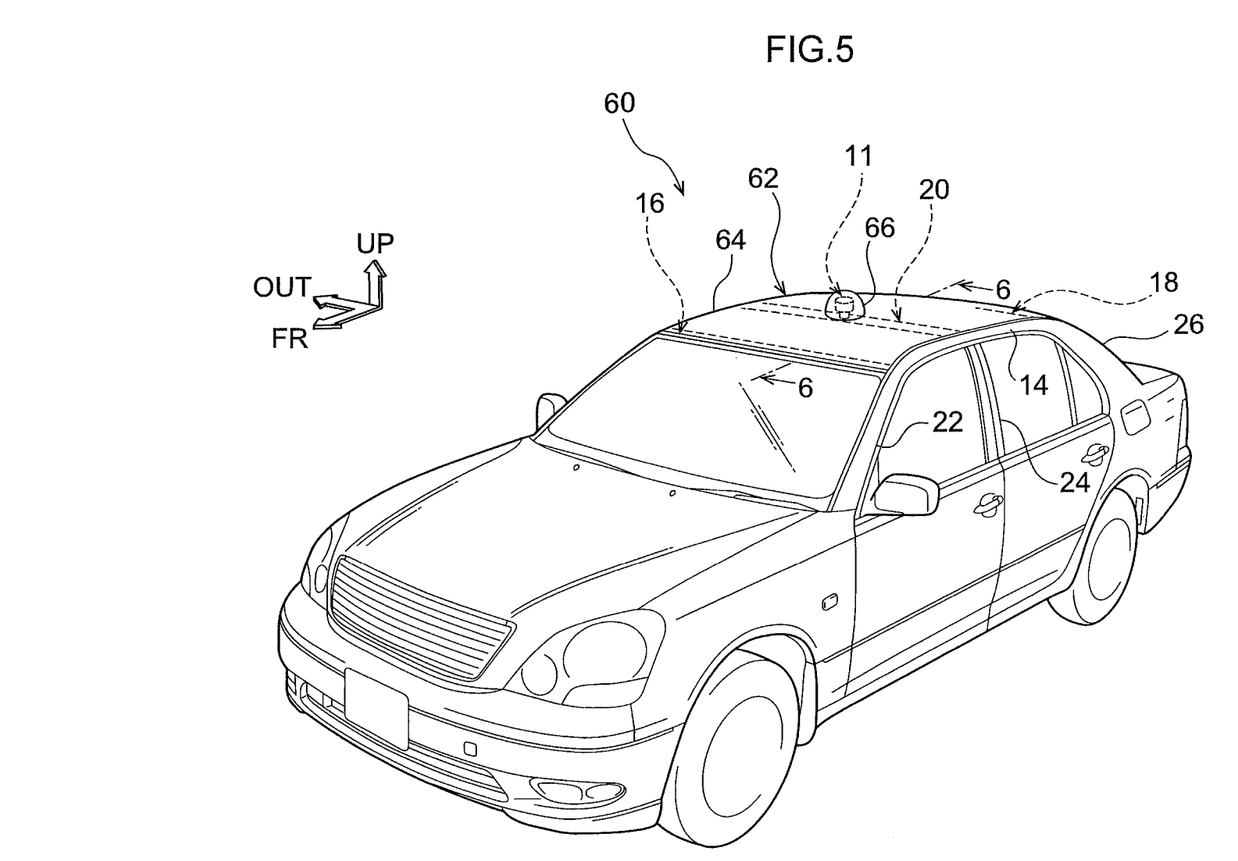
FIG. 5 is a perspective view showing a vehicle to which a vehicle upper portion structure relating to a second embodiment is applied.

As shown in FIG. 5, at the vehicle upper portion of a vehicle 60 to which the vehicle upper portion structure relating to the present embodiment is applied, the roof side rails 14 extends in the vehicle longitudinal direction, and the roof reinforcement 20 that serves as a reinforcing member spans between these roof side rails 14 in the vehicle transverse direction. Further, the peripheral information detecting sensor 11 is mounted to the upper portion of the roof reinforcement 20.

Further, the roof panel 62 is disposed further toward the vehicle upper side than the peripheral information detecting sensor 11, and the peripheral information detecting sensor 11 is covered by the roof panel 62 from the vehicle upper side. Here, the roof panel 62 of the present embodiment is structured so as to include a first panel 64 and a second panel 66.

Figure 6:
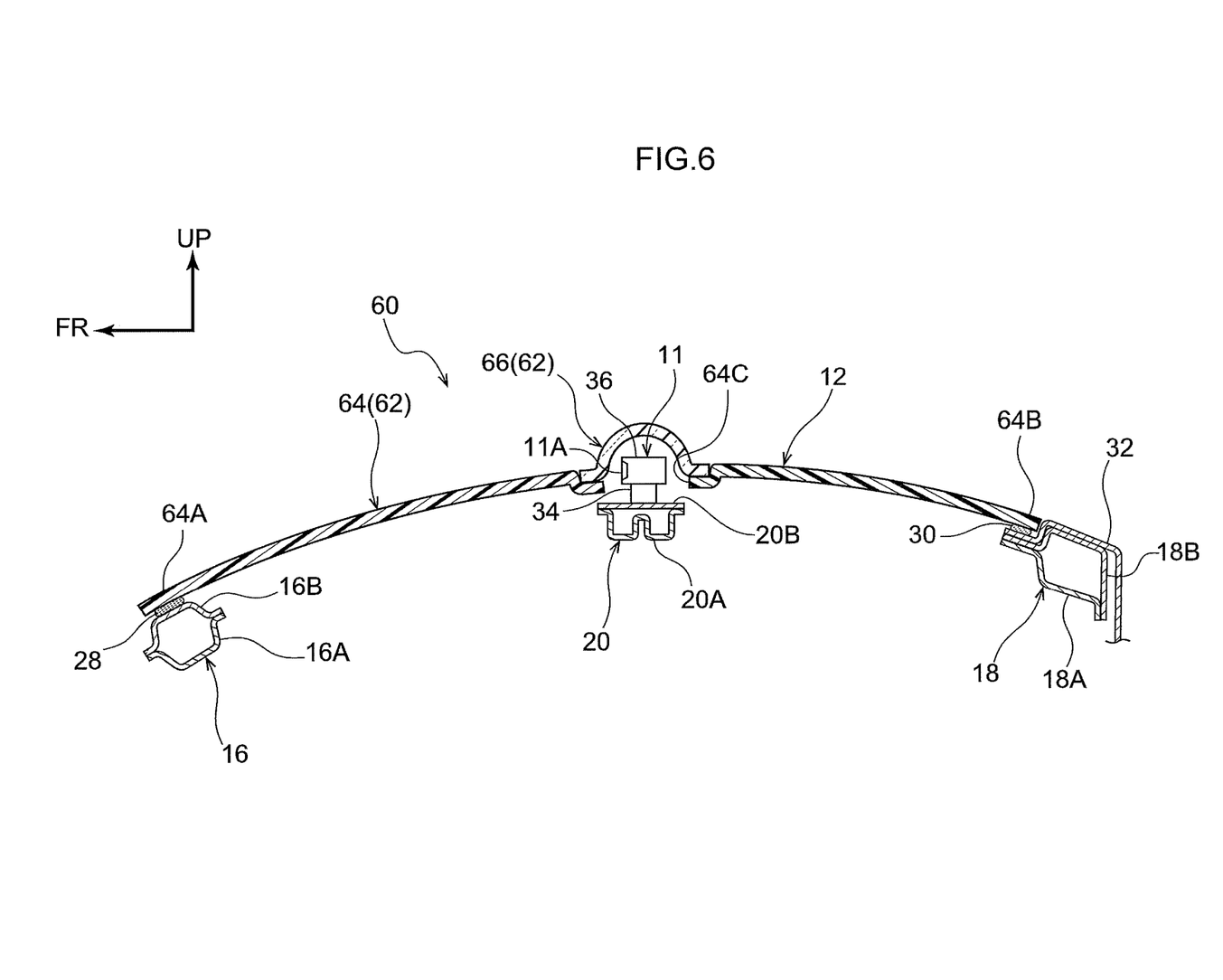
FIG. 6 is a cross-sectional view showing, in an enlarged manner, the state cut at line 6-6 of FIG. 5.

As shown in FIG. 6, the first panel 64 is curved so as to be convex toward the vehicle upper side as seen from the vehicle transverse direction, and, in the present embodiment, is formed from an opaque resin material. Further, a front end portion 64A of the first panel 64 is joined to the upper portion of the front header 16 by the adhesive material 28. Moreover, a rear end portion 64B of the first panel 64 is joined to the upper portion of the rear header 18 by the adhesive material 30.

Here, an opening portion 64C is formed in the central portion of the first panel 64. The second panel 66 is provided on the outer edge of the opening portion 64C. The second panel 66 is molded integrally with the first panel 64, and, in the present embodiment, is formed by two-color molding (double molding).

Further, the second panel 66 is formed substantially in the shape of a bowl whose vehicle lower side is open, and is disposed so as to cover the periphery of the rotating portion 36 of the peripheral information detecting sensor 11. Namely, the region that faces the detecting section 11A is formed by the second panel 66.

Moreover, the second panel 66 is formed of a material that transmits therethrough the detection medium that the peripheral information detecting sensor 11 detects. In the present embodiment, the second panel 66 is formed from a transparent resin in order to transmit the laser light, that is illuminated from the detecting section 11A, therethrough.

(Operation and Effects)

Operation and effects of the vehicle 60, to which the vehicle upper portion structure relating to the present embodiment is applied, are described next. In the present embodiment, the roof panel 62 is structured to include the first panel 64 and the second panel 66. The second panel 66, that is formed from a material (a transparent resin) that transmits the detection medium therethrough, is disposed at the region that faces the detecting section 11A (the rotating portion 36). Due thereto, even though the peripheral information detecting sensor 11 is covered by the roof panel 62, peripheral information of the vehicle can be detected.

Further, the first panel 64, that structures the majority of the roof panel 62, is formed from an opaque resin material. Due thereto, as compared with the vehicle 60 at which the entire roof panel 62 is formed from a transparent resin, the peripheral information detecting sensor 11 is inconspicuous, and therefore, the appearance of the vehicle 60 can be improved. The other operations are similar to those of the first embodiment.

Note that, although the first panel 64 is formed of an opaque resin material in the present embodiment, the present invention is not limited to this, and, for example, the first panel 64 may be formed from a semi-transparent resin material. In this case as well, the peripheral information detecting sensor 11 is not conspicuous, and the appearance of the vehicle 60 can be improved.

Further, although the second panel 66 is formed from a transparent resin in the present embodiment, the present invention is not limited to this, and the second panel 66 may be formed from another material provided that is formed from a material that transmits the detection medium therethrough. For example, in a case in which a millimeter wave radar is used as the peripheral information detecting sensor 11, it suffices to form the second panel 66 from a material that transmits radio waves therethrough. Namely, the second panel 66 may be formed of an opaque resin material.

Moreover, although the second panel 66 is formed substantially in the shape of a bowl in the present embodiment, the second panel 66 may be formed in another shape. For example, the second panel 66 may be a shape that improves the aerodynamic characteristics, and may be a so-called shark-fin shape.

Third Embodiment

A vehicle, to which a vehicle upper portion structure relating to a third embodiment of the present invention is applied, is described next with reference to FIG. 7. Note that the present embodiment is made to be a structure that is similar to the first embodiment, except for a sunroof unit 74. Further, structures that are similar to those of the first embodiment are denoted by the same reference numerals, and description thereof is omitted.

Figure 7:
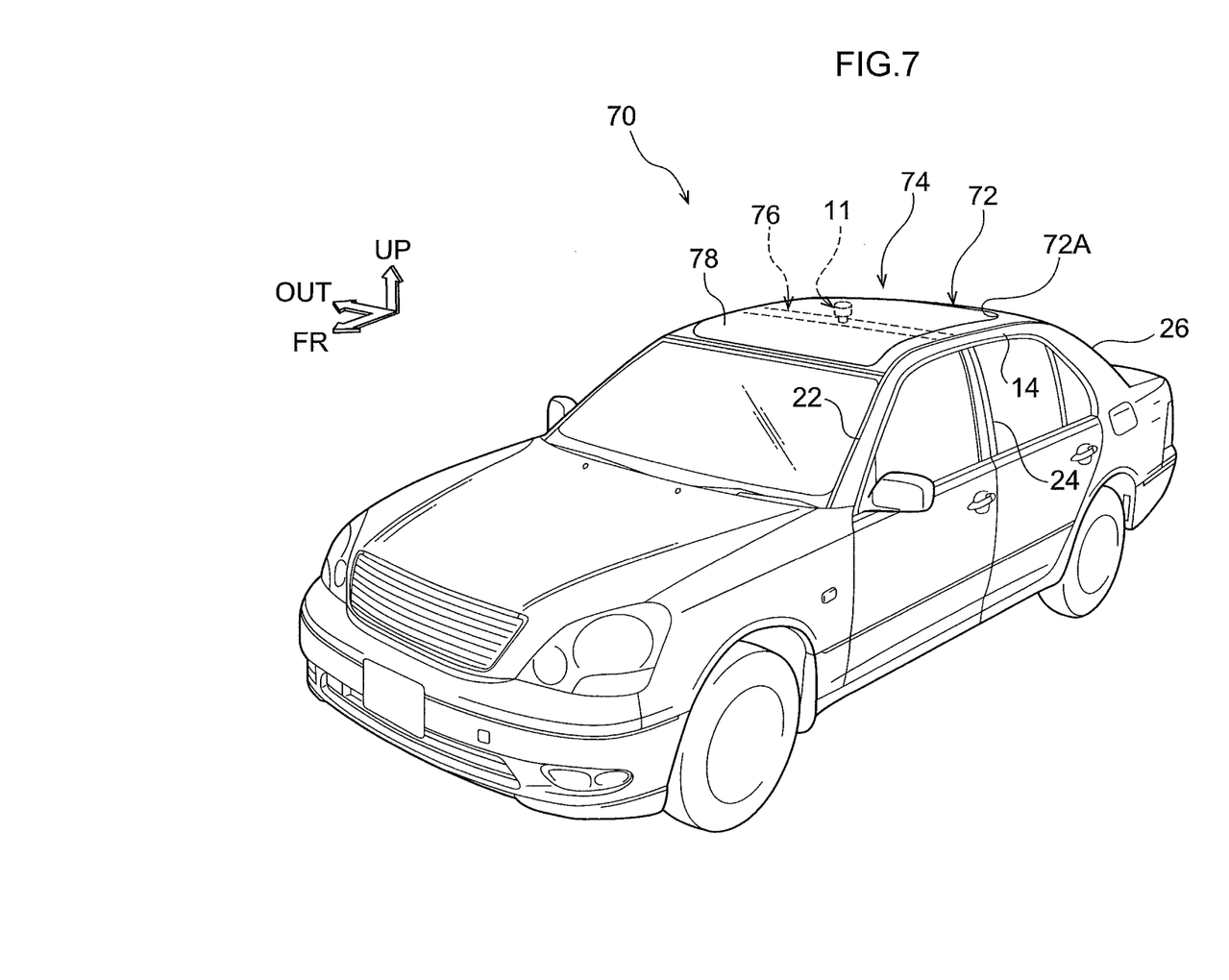
FIG. 7 is a perspective view showing a vehicle to which a vehicle upper portion structure relating to a third embodiment is applied.

As shown in FIG. 7, at the upper portion of a vehicle 70 relating to the present embodiment, a roof panel 72 is disposed between the roof side rails 14. Here, the sunroof unit 74 is provided at the roof panel 72.

The sunroof unit 74 is structured to include a sunroof 78 that structures a portion of the roof panel 72, an unillustrated moving mechanism that moves the sunroof 78, and an unillustrated sunroof frame that guides the sunroof 78.

The sunroof frame is disposed further toward the vehicle lower side than the roof panel 72, and is disposed so as to surround an opening portion 72A that is formed in the roof panel 72. Further, the sunroof frame has a frame member 76 that serves as a reinforcing member and that extends in the vehicle transverse direction. The peripheral information detecting sensor 11 is mounted to this frame member 76.

The sunroof 78 is movably supported at the sunroof frame, and is structured so as to be able to move, by the unillustrated moving mechanism, between an open position at which the sunroof 78 opens the opening portion 72A, and a closed position (the position shown in FIG. 7) at which the sunroof 78 closes the opening portion 72A. Further, at the closed position, the peripheral information detecting sensor 11 is covered from the vehicle upper side by the sunroof 78. Moreover, the sunroof 78 is formed from a material (a transparent resin) that transmits therethrough the detection medium that the peripheral information detecting sensor 11 detects.

(Operation and Effects)

Operation and effects of the vehicle 70, to which the vehicle upper portion structure relating to the present embodiment is applied, are described next. In the present embodiment, by mounting the peripheral information detecting sensor 11 to the frame member 76 that structures the sunroof unit 74, there is no need to separately provide a member for mounting the peripheral information detecting sensor 11. Namely, the number of parts that are needed in order to mount the peripheral information detecting sensor 11 to the vehicle 70 can be reduced.

Further, the peripheral information detecting sensor 11 is covered from the vehicle upper side by the sunroof 78 at the closed position. Therefore, the peripheral information detecting sensor 11 is inconspicuous, and the appearance can be improved. The other operations are similar to those of the first embodiment.

Although a first embodiment through a third embodiment of the present invention have been described above, the present invention is not limited to the above-described structures, and can, of course, be implemented in various forms other than the above-described structures within a scope that does not depart from the gist thereof. For example, although the peripheral information detecting sensor 11 is mounted between the front header 16 and the rear header 18 in the above-described embodiments, the present invention is not limited to this. Namely, the peripheral information detecting sensor 11 may be mounted to the front header 16 or the rear header 18. In this case, a bracket may be fastened to the front header 16 or the rear header 18, and the peripheral information detecting sensor 11 mounted to this bracket.

Further, the shape and size of the peripheral information detecting sensor 11, and the position and shape of the detecting section 11A, in the above-described embodiments are not particularly limited, and may be changed appropriately in accordance with the type of the peripheral information detecting sensor 11, and the position where the peripheral information detecting sensor 11 is placed, and the like.

What is claimed is:

1. A vehicle upper portion structure comprising:
   a peripheral information detecting sensor that is mounted to a vehicle upper portion, and that has a detecting section that illuminates laser light and obtains peripheral information of a vehicle by detecting a reflected light of the laser light; and
   a roof panel that is continuously curved and terminated at a pair of left and right roof side members and that covers the peripheral information detecting sensor from a vehicle upper side, and at which at least a region, that faces the detecting section, is formed of a material that transmits the laser light therethrough,
   wherein the peripheral information detecting sensor is mounted to a reinforcing member that spans in a vehicle transverse direction between the pair of left and right roof side members that extend in a vehicle longitudinal direction, the reinforcing member being disposed in an area separated by a front header spanning between front end portions of the roof side members and a rear header spanning between rear end portions of the roof side members.

2. The vehicle upper portion structure of claim 1, wherein respect to the roof panel, and
   the peripheral information detecting sensor is mounted between the reinforcing member and the roof panel.

3. The vehicle upper portion structure of claim 1, wherein the roof panel is supported by the peripheral information detecting sensor that is mounted to the reinforcing member.

4. The vehicle upper portion structure of claim 2, wherein the roof panel is supported by the peripheral information detecting sensor that is mounted to the reinforcing member.

5. The vehicle upper portion structure of claim 1, wherein
   a sunroof unit, that has a sunroof that structures a portion of the roof panel, is provided at the vehicle upper portion, and
   the peripheral information detecting sensor is mounted to the reinforcing member, that structures the sunroof unit, and is covered by the sunroof from the vehicle upper side.

6. The vehicle upper portion structure of claim 1, wherein the peripheral information detecting sensor includes a base portion and a rotating portion substantially shaped as a cylinder of a larger diameter than a width dimension of the base portion and disposed at an upper portion of the base portion, and
the detecting section is provided at the rotating portion.

7. The vehicle upper portion structure of claim 1, wherein the detecting section is configured to rotate on a substantially horizontal plane.

* * * * *